United States Patent [19]

Niehaus

[11] Patent Number: 4,499,908
[45] Date of Patent: Feb. 19, 1985

[54] COMBINE CONCAVE STRUCTURE

[76] Inventor: Frederick D. Niehaus, Rte. 1, Martelle, Iowa 52305

[21] Appl. No.: 577,866

[22] Filed: Feb. 7, 1984

Related U.S. Application Data

[63] Continuation of Ser. No. 364,502, Apr. 1, 1982.

[51] Int. Cl.³ .................. A01F 12/26; A01F 12/28
[52] U.S. Cl. ................... 130/27 K; 130/27 L
[58] Field of Search ............ 130/27 K, 27 L, 27 S, 130/27 T

[56] References Cited

U.S. PATENT DOCUMENTS

| | | | |
|---|---|---|---|
| 792,986 | 6/1905 | Henderson | 130/27 J |
| 1,573,178 | 2/1926 | McCullough | 130/27 K |
| 1,617,624 | 2/1927 | Fick | 130/27 K |
| 2,053,148 | 9/1936 | James | 130/27 T |
| 2,154,483 | 4/1939 | Bedolla | 130/27 S |
| 2,247,557 | 1/1941 | Medley | 130/27 K |
| 2,457,680 | 12/1948 | Johnson | 130/27 K |
| 3,552,396 | 1/1971 | Gerhardt | 130/27 J |
| 3,568,682 | 3/1971 | Knapp | 130/27 T |
| 3,631,862 | 1/1972 | Rowland-Hill et al. | 130/27 L |
| 3,696,815 | 10/1972 | Rowland-Hill et al. | 130/27 J |
| 3,742,686 | 7/1973 | Rowland-Hill | 130/27 T |
| 4,165,751 | 8/1979 | Todd | 130/27 T |
| 4,222,395 | 9/1980 | Johnston et al. | 130/27 T |
| 4,230,130 | 10/1980 | Staiert | 130/27 T |
| 4,258,726 | 3/1981 | Glaser et al. | 130/27 L |
| 4,270,550 | 6/1981 | Da Silva | 130/27 T |
| 4,284,086 | 8/1981 | Williams | 130/27 T |
| 4,330,000 | 5/1982 | Peiler | 130/27 L |

*Primary Examiner*—Paul J. Hirsch
*Attorney, Agent, or Firm*—Zarley, McKee, Thomte, Voorhees & Sease

[57] ABSTRACT

The improved combine concave structure of the present invention includes a concave having a grid work of axially extending members and circumferentially extending members. Each of these members has an interior surface which is flat. The flat surfaces of the axially extending members are in the same curved surface as the flat surfaces of the circumferentially extending members so that there are no inward projections extending from the interior cylindrical surface of the concave. In addition, a flap is placed over the juncture between the hinged edge of the concave and the lower edge of the cylindrical housing above the concave. This prevents grain from spilling out through the juncture between the concave and the cylindrical housing thereabove.

1 Claim, 5 Drawing Figures

U.S. Patent  Feb. 19, 1985  4,499,908
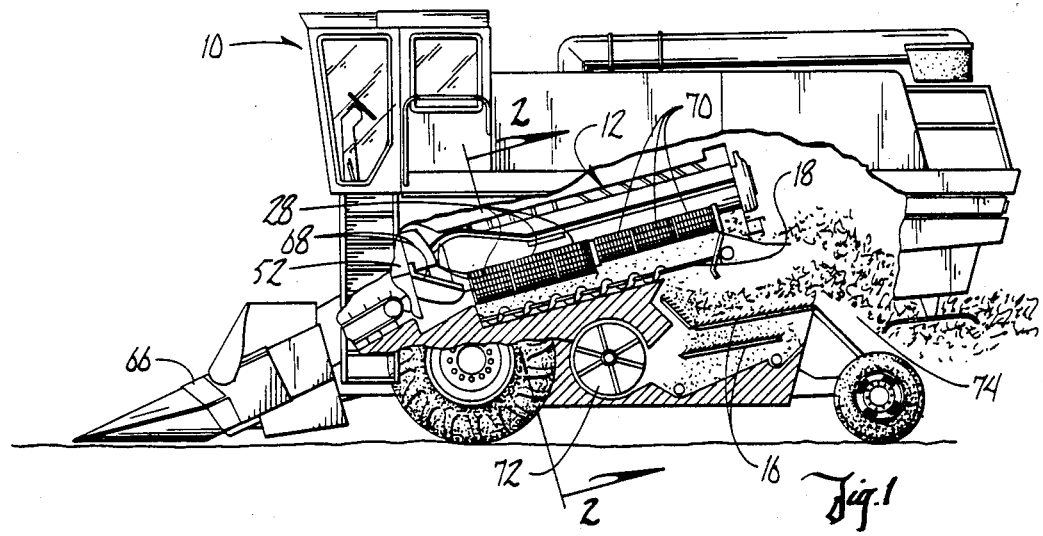
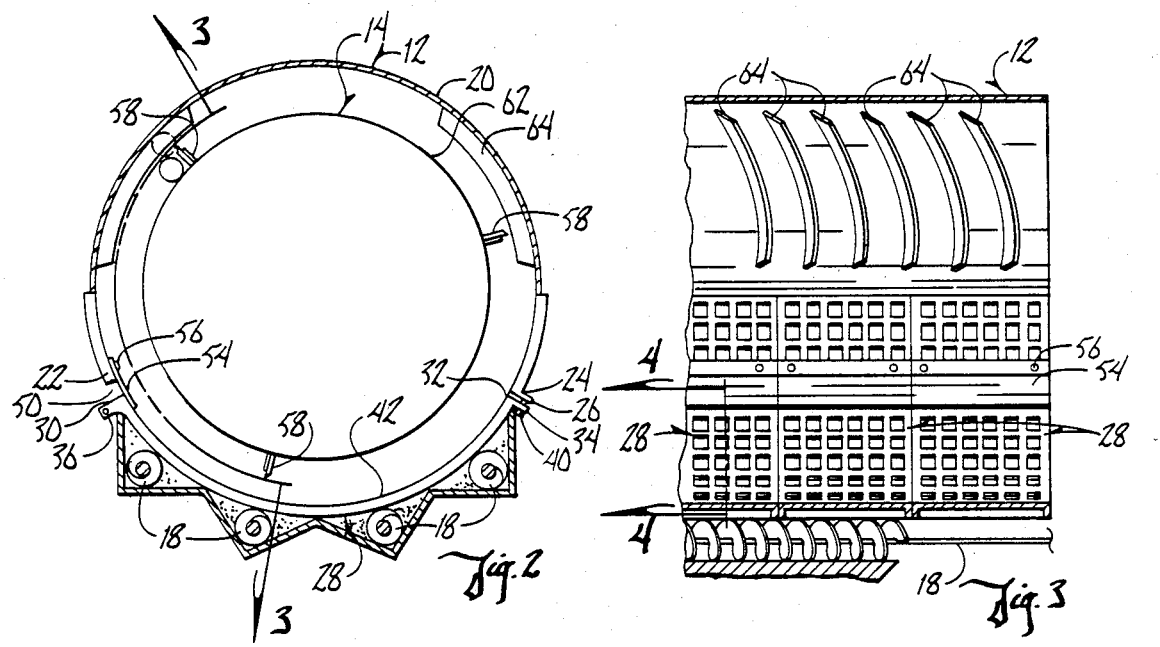
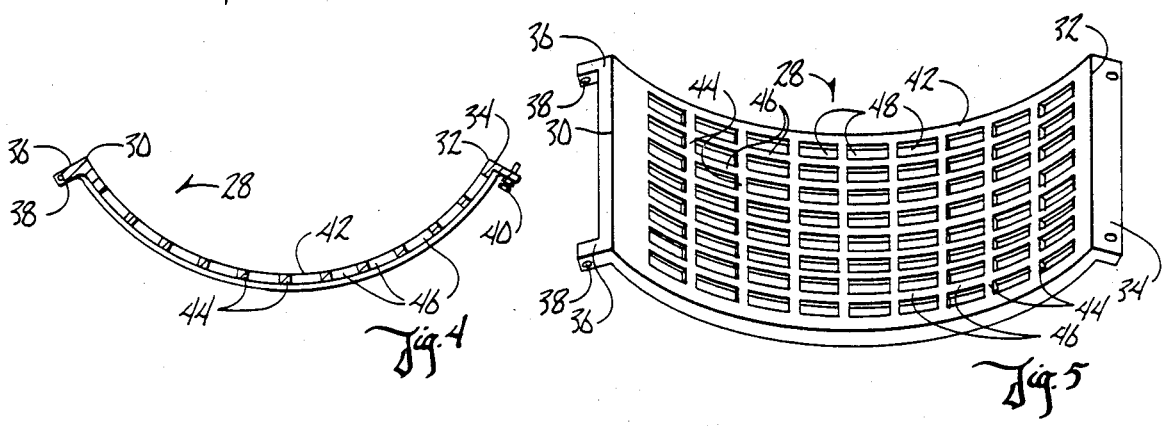

COMBINE CONCAVE STRUCTURE

This is a continuation application of co-pending application, Ser. No. 364,502, filed Apr. 1, 1982.

BACKGROUND OF THE INVENTION

This invention relates to an improved combine concave structure.

Numerous types of concave structures are used in combines presently known. Conventionally these concave structures form the bottom cylindrical surface of a cylindrical housing in which a rotor rotates. The grain is compressed between the outer surface of the rotor and the interior surface of the cylindrical housing so that the grain is removed from the cob or chaff and is permitted to fall through the grate formed by the concave structure.

Present concave structures utilize a grid work of axially extending members are circumferentially extending members. In prior art concave structures, the interior surfaces of the axially extending members lie in a different arcuate surface than the interior surfaces of the circumferentially extending members. This results in the circumferential and axial members lying in two separate concentric arcuate surfaces. Consequently, a rough interior cylindrical surface is presented by this concave structure.

When present day structures are utilized, the corn shucks, or chaff from other types of grain, catch on the rough inwardly presented surface of the concave. During operation, the concave often becomes clogged, particularly at the feed end of the rotor. The result is that the farmer must clean out the concaves numerous times during operations.

Another problem encountered with present day concave structures is that a small opening is often formed adjacent the adjoining edges of the concave and the cylindrical housing thereabove. This problem is particularly noticeable adjacent the one edge of the concave which is hinged. This results in one of two phenomena occurring. Corn shucks, silks or other chaff fall through the opening caused by the juncture and fall onto the augers which are below the concave structure. This results in clogging or overworking of the augers which requires cleaning.

Therefore, a primary object of the present invention is the provision of an improved concave structure which will reduce the clogging of the concave and of the augers below the concave, particularly adjacent the intake end of the rotor cylinder.

A further object of the present invention is the minimizing of the clogging of the concave with corn stalks, corn silks, or other debris from other types of grain crops.

A further object of the present invention is the provision of an improved concave structure wherein corn shucks, corn silks, chaff, or other materials are not permitted to escape through the juncture between the concave and the remaining cylindrical housing of the combine.

A further object of the present invention is the provision of a device having a concave structure which minimizes the damage to the grain kernels during the combining process.

A further object of the present invention is the provision of a concave structure which presents a relatively smooth cylindrical surface toward the rotor within the combine cylinder.

A further object of the present invention is the provision of a device which is economical to manufacture and durable in use.

SUMMARY OF THE INVENTION

The present invention utilizes a concave which has axially extending members and circumferentially extending members. Each of these members has a flat interior surface presented toward the rotor. The flat surfaces of the axially extending members are in the same circular surface as the circumferentially extending members. This presents a smooth grid surface which faces the rotor.

A further feature of the present invention includes an elongated, rectangular plate which is fastened to the lower edge of the upper cylindrical housing. The flat plate extends over the juncture between the concave and the lower edge of the cylindrical housing so as to prevent chaff and corn stalks from exiting through the juncture between the housing and the concave.

Utilization of the above two mentioned improvements reduces the clogging and conjestion around the intake end of the combine cylinder. Furthermore, it minimizes the clogging and binding of the augers which are below the concave cylinder, particularly adjacent the intake end of the cylinder.

The rectangular cover plate also minimizes the clogging which occurs adjacent the intake end of the combine cylinder. Furthermore, the utilization of this plate, together with the concave structure identified above, results in less damage to the grain kernels during the combining process. This results in better retainage of the vitamins, minerals and enzymes within the grain.

BRIEF DESCRIPTION OF THE DRAWINGS

FIG. 1 is a side elevational view of a combine, with the exterior wall broken away to show the interior workings thereof.

FIG. 2 is a sectional view taken along line 2—2 of FIG. 1.

FIG. 3 is a sectional view taken along line 3—3 of FIG. 2.

FIG. 4 is a sectional view taken along line 4—4 of FIG. 3.

FIG. 5 is a perspective view of the concave of the present invention.

DETAILED DESCRIPTION OF THE PREFERRED EMBODIMENT

Referring to the drawings, the numeral 10 generally refers to a typical combine assembly having the concave structure of the present invention adapted thereto. Assembly 10 comprises a combine cylinder 12, a rotor 14, rotatably mounted within the combine cylinder 12, a plurality of conveyor augers 18 below cylinder 12 for carrying away the grain which sifts downwardly through cylinder 12, and a plurality of horizontal sieves 16 which receive the grain from augers 18 in conventional fashion.

Cylinder 12 comprises an upper partial cylindrical housing 20 having a first lower edge 22 and a second lower edge 24. Lower edge 24 has a flange 26 thereon.

Positioned below partial cylindrical housing 20 is a concave structure 28 which has an arcuate shape and which forms a continuation of the partial cylinder formed by cylinder housing 20. Concave 28 includes a first edge 30 and a second edge 32. A flange 34 similar to flange 26 is provided adjacent edge 32. A pair of hinge arms 36 extend from first edge 30 and include hinge openings 38 which are adapted to be mounted to the frame of the combine so as to permit concave 28 to pivot about an axis extending through openings 38. An adjustable bolt 40 extends through flanges 34, 26 so as to secure second edge 32 of concave 28 to flange 26 of upper housing 20. Bolt means 40 is adjustable so as to permit selective adjustment of the position of the concave about its pivotal axis 38, thereby permitting the selective adjustment of the interior concave surface 42 of concave 28 radially inwardly and outwardly with repect to the cylindrical axis of combine cylinder 12. This permits selective adjustment of the distance which concave 28 is from rotor 14.

Concave 28 is formed from a plurality of axially extending members 44 and a plurality of circumferentially extending members 46 which intersect with one another to form a grid work having a plurality of openings 48 therein. Each of the members 44, 46 includes a flat interior surface which is presented toward rotor 14. The interior flat surfaces of members 44, 46 coincide in the same cylindrical surface so as to present a flat cylindrical grid work facing towards rotor 14. The flat surfaces of members 44, 46 are equidistant from the cylindrical axis of rotor 14 and cylinder 12.

The arrangement of the flat inwardly presented surfaces of members 44, 46 is to be contrasted with the structure in previous concave devices. In prior devices, the grid work is comprised of axially extending members which lie in a circular surface which is concentrically located with respect to the circular surface of the circumferentially extending members. The present invention in contrast is formed so that the cylindrical surface defined by the axially extending members coincides with the cylindrical surface formed by the flat surfaces of the circumferentially extending members. This presents a smooth surface having a plurality of openings 48 therein in contrast to the rough surfaces provided in prior art concave structures.

As can be seen in FIG. 2, a small opening 50 is formed in the space between first edge 30 of concave 28, and lower edge 22 of cylindrical housing 20. The size of this space 50 may vary depending upon the particular rotational position that is given to concave 28 by virtue of adjustable bolt 40. However, space 50 presents a problem in prior art devices in that it permits the chaff, corn stalks, or other debris to exit cylinder 12 and to fall downwardly onto augers 18. This results in a clogging of the augers 18, particularly the left-most auger 18 as viewed in FIG. 2. The grain normally is fed into the intake opening 52 of cylinder 12, progressing axially therethrough until all of the grain has fallen through the concave, and has been carried away to the sieves 16 by augers 18. However, in these prior art devices, the augers 18 and concavess 28 often become clogged adjacent the intake opening of the cylinder.

Applicant has minimized the amount of clogging which occurs adjacent the intake end of the cylinder by providing an elongated rectangular plate 54 which is attached adjacent its upper edge to housing 20 by means of bolts 56 and which extends downwardly therefrom in covering relation over opening 50 and in contact with concave 28 at a point spaced inwardly from edge 30 thereof. Plate 54 extends along the axial length of cylinder 12 so as to completely cover opening 50. As can be seen in FIG. 1, cylinder 12 is comprised of numerous sections, and preferably a separate plate 30 will be provided for each section, just as a separate concave 28 is provided for each section.

Rotor 14 is of conventional structure and may be varied without detracting from the invention. Typically, such a rotor will contain rasp bars 58 which causes the grain to be moved axially within cylinder 12. Rotor 14 also includes a hub 60 which has an outwardly presented cylindrical surface 62 which forms an inner wall concentric to and spaced inwardly from concave 28. On the interior surface of cylinder 12 are a plurality of angled fins 64 which contribute to the axial movement of the grain along the cylinder 12.

In operation, the header 66 of the combine cuts the grain and carries the grain upwardly to the intake opening 52. At the intake opening 52 an impeller blade 68 located on the end of rotor 14 engages the grain and propels it axially into the combine cylinder 12. The grain is buffeted about within cylinder 12 so that the grain kernels become removed from the stalks or chaff and fall downwardly through the openings 48 in concaves 28. During this operation, the unshelled grain continues moving axially within cylinder 12 until it encounters a plurality of grates 70. Each grate 70 is of the same general construction as concaves 28, with the exception that the openings 48 therein are somewhat larger than the openings 48 in concaves 28. The shelled corn or grain falls through these openings 48 in grates 70.

The grain falling through the concaves 28 and the grates 70 falls on augers 18 and is carried axially by augers 18 to a point where the grain is deposited on sieves 16. Sieves 16 are usually mounted on an oscillating frame so as to create a shaking action, thereby permitting the grain to pass downwardly through the sieves. A fan 72 blows a stream of air over the grates 16 and causes the chaff and stalks to be removed rearwardly through the stalk discharge opening 74.

The rectangular plate 54 prevents the chaff, stalks, or silks, from falling downwardly through opening 50 and by so doing, clogging the left most auger 18 as viewed in FIG. 2. Similarly, the smooth contour of concaves 28 and grates 70 prevents the stalks, chaff or corn silk from becoming embedded in and clogging the openings 48 in concaves 28 and grates 70.

While the present invention involves only slight modification of the concave structure, the results obtained are significant. A significantly less amount of clogging occurs adjacent the intake end of cylinder 12. Furthermore, the augers remain cleaner and tend to become clogged much less often. The grain itself is damaged less, presumably because of the smooth surface presented by the interior surfaces of members 44, 46. The grain is cleaner and is damaged less.

Furthermore, it is possible to move the combine at a faster rate through the corn field. Experience in the field has shown that the combine can move one to one and one-half miles an hour faster than devices which do not incorporate the present invention. Furthermore, it is not necessary to stop the combine as often to clean out the sieves and concaves as was the case with prior devices.

Thus, it can be seen that the device accomplishes at least all of its stated objectives.

What is claimed is:

1. An improvement in a combine having a combine frame, a rotor mounted to said frame for rotation about a horizontal axis, said rotor having an outer radial surface, a cylindrical housing assembly surrounding and enclosing said cylindrical surface of said rotor, said housing assembly comprising an upper housing portion and a concave portion connected to said upper housing portion and forming a lower cylindrical wall for said housing assembly; said concave portion having first and second opposite lateral edges, said first lateral edge being hinged to said frame for hinged movement about a hinge axis running parallel to said horizontal axis of said rotor, said second lateral edge being adjustably attached to said upper housing to permit selective adjustment of the concave portion about said hinge axis so as to move said concave toward and away from said rotor; said concave comprising a grid work mesh formed by a plurality of spaced apart axially extending members and a plurality of spaced apart circumferentially extending members; said improvement comprising:

said circumferentially extending members and said axially extending members each having an interior flat surface presented radially inwardly toward said rotor, all of said inwardly interior flat surfaces of said circumferentially extending members and said axially extending members lying in a single cylindrical surface so that they are free from projections extending radially inwardly therefrom;

said upper housing portion forming a part of the circular cylinder and including first and second opposite lateral side edges, said first side edge of said upper housing portion being adjacent said first lateral edge of said concave portion, a rectangular cover plate having a first elongated edge attached to said upper housing along a line extending parallel to and being spaced above said first side edge of said upper housing portion, said cover plate having a second elongated edge which engages the interior surface of said concave portion along a line adjacent and spaced below said first edge of said concave portion, whereby said cover plate spans and covers the junction between said first edge of said upper housing portion and said first edge of said concave portion.

* * * * *